US008645733B2

(12) United States Patent
Kansal et al.

(10) Patent No.: US 8,645,733 B2
(45) Date of Patent: Feb. 4, 2014

(54) VIRTUALIZED APPLICATION POWER BUDGETING

(75) Inventors: Aman Kansal, Issaquah, WA (US); Jie Liu, Medina, WA (US); Sean McGrane, Sammamish, WA (US); Harold Lim, Durham, NC (US)

(73) Assignee: Microsoft Corporation, Redmond, WA (US)

( * ) Notice: Subject to any disclaimer, the term of this patent is extended or adjusted under 35 U.S.C. 154(b) by 188 days.

(21) Appl. No.: 13/107,806

(22) Filed: May 13, 2011

(65) Prior Publication Data

US 2012/0290865 A1    Nov. 15, 2012

(51) Int. Cl.
*G06F 1/26* (2006.01)
*G06F 1/32* (2006.01)

(52) U.S. Cl.
USPC .......................... 713/320; 713/300; 713/324

(58) Field of Classification Search
USPC .......................... 713/300, 320, 324
See application file for complete search history.

(56) References Cited

U.S. PATENT DOCUMENTS

| | | | |
|---|---|---|---|
| 5,532,945 A | 7/1996 | Robinson | |
| 6,986,069 B2 | 1/2006 | Oehler et al. | |
| 7,135,956 B2 | 11/2006 | Bartone et al. | |
| 7,281,146 B2 | 10/2007 | Nalawadi et al. | |
| 7,444,526 B2 | 10/2008 | Felter et al. | |
| 7,529,948 B2 | 5/2009 | Conroy et al. | |
| 7,536,573 B2 | 5/2009 | Schumacher et al. | |
| 7,647,516 B2 | 1/2010 | Ranganathan et al. | |
| 2006/0112286 A1 | 5/2006 | Whalley et al. | |
| 2007/0180280 A1* | 8/2007 | Bolan et al. .................. | 713/300 |
| 2008/0250415 A1 | 10/2008 | Illikkal et al. | |
| 2008/0301473 A1 | 12/2008 | Perez et al. | |
| 2009/0019202 A1* | 1/2009 | Shetty et al. .................. | 710/116 |
| 2009/0307036 A1* | 12/2009 | Archer et al. ..................... | 705/8 |
| 2010/0185883 A1 | 7/2010 | Hamilton | |
| 2011/0213997 A1* | 9/2011 | Kansal et al. ................. | 713/324 |
| 2011/0239010 A1* | 9/2011 | Jain et al. ....................... | 713/310 |
| 2012/0137289 A1* | 5/2012 | Nolterieke et al. ............... | 718/1 |
| 2012/0226922 A1* | 9/2012 | Wang et al. .................... | 713/320 |

OTHER PUBLICATIONS

Dasgupta et al., "Workload Management for Power Efficiency in Virtualized Data-Centers", ACM, 2009, 1-17.
Nathuji et al., "VPM Tokens: Virtual Machine-Aware Power Budgeting in Datacenters", HPDC'08, Proceedings of the 17th international symposium on High performance distributed computing, Jun. 23-27, 2008, 119-128.

(Continued)

*Primary Examiner* — Vincent Tran
(74) *Attorney, Agent, or Firm* — Woodcock Washburn, LLP

(57) ABSTRACT

Virtualized application power budgeting can manage power budgeting for multiple applications in data centers. This power budgeting may be done in intelligent and/or dynamic ways and may be useful for updating power budgets, resolving conflicts in requests for power, and may improve the efficiency of the distribution of power to multiple applications.

Virtualized application power budgeting can distinguish between priority applications and non-priority applications at a granular, virtual machine level and reduce the power consumption to only non-priority applications when there are power consumption conflicts. Virtualized application power budgeting may be able to determine the most efficient manner of providing power to each application in a data center. Further, virtualized application power budgeting may be able to distribute power according to application priority and other predetermined requirements and improve the efficiency of the power consumption by the devices in the data center.

20 Claims, 14 Drawing Sheets

(56) References Cited

OTHER PUBLICATIONS

Verma et al., "BrownMap: Enforcing Power Budget in Shared Data Centers", IBM Research Report, Systems Management, Dec. 17, 2009, 15 pages.

Wang et al., "Co-Con: Coordinated Control of Power and Application Performance for Virtualized Server Clusters", Jul. 13-15, 2009, 9 pages.

Wang et al., "Coordinating Power Control and Performance Management for Virtualized Server Clusters", IEEE Transactions on Parallel and Distributed Systems, Feb. 2011, 22(2), 245-259.

* cited by examiner

VIRTUALIZED APPLICATION POWER BUDGETING

BACKGROUND

Some data centers run several large applications, with each application running on hundreds or even thousands of computing devices. These large applications can be three tier business applications, HPC applications or large applications such as Bing, Google, Hotmail, Facebook, Yahoo, Amazon and the like. These can be cloud based. Other data centers run more of a one application to one server model.

Data centers have limited resources and as such, allocation of power and computing resources are of key concern for data centers. Each application may be budgeted a peak amount of power/resources and each application may, at various times, consume power and computing resources at widely varying rates. Accordingly, the peak amounts of power budgeted for all applications combined at a single data center may be greater than the total power available to the data center at a given time. As such, it is necessary to budget power consumption to resolve conflicts between total available power and multiple applications requiring power. In other words, power, both peak and average over time must be budgeted. In order to understand how power is budgeted, it is important to understand the architecture of applications in data centers.

Today's larger applications running in data centers tend to operate on a plurality of computing systems, each system containing multiple virtual machines, each virtual machine running a portion of the application. This structure has multiple benefits. For example, errors resulting from server failure can be minimized, i.e. failure of a server might mean a small portion of multiple applications would be affected instead of a large portion of a single application. In addition, computing devices have resources proportioned typically without prior knowledge of the application that will be running on it. As such, if a single application were running on a computing device, some of the resources may not be entirely utilized. Accordingly, applications can be split across multiple computing devices in ways that allow for greater utilization of the total resources of the computing system. Further, there may be requirements for a minimum number of servers running an application such that updates to the application may be made seamlessly to prevent interruption of services.

Each computing device running a portion of an application requires power to operate. Virtual machines may have a relationship between the amount of power provided to the virtual machine and the performance of the virtual machine. In other words, more power can mean more processing capability and less power can mean less processing capability. More and more, data centers are becoming large, power intensive entities. For a variety of reasons, the power available may be limited at a data center. For example, during daytime operation, the total power available to the data center may depend on the output of nearby power stations and the consumption of nearby city centers and the like. As such, there is a limit to the total power consumption and accordingly, the amount of 'processing' that may be performed at a data center.

Applications do not run in steady state. In other words if there is an increase in number of people logging onto a particular application, the application may need to adapt by increasing the number of virtual machines running the application, which is linked to an increase in the power consumption by the application.

Conflicts in the total power available and the requirements of applications based on utilization, power failures and the like may occur. Data centers have dealt with these conflicts using brute force methods. One such method is known as power capping across the entire server. In server power capping, the power allotted for the server is reduced without regard to priority of the application or application configuration. Such a method resolves the conflict and reduces the power to all applications on the server. Another method could be capping across all servers in the data center. In such an example, the power available to all applications without regard to application architecture and the priority of the particular application. These known methods use hardware/firmware only to reduce the power consumption.

SUMMARY

Disclosed herein is virtualized application power budgeting. In one embodiment, virtualized application power budgeting may be able to manage power budgeting in data centers. This power budgeting may be done in intelligent and/or dynamic ways and may be useful for updating power budgets for applications dynamically, resolving conflicts in requests for power, and may improve the efficiency of the distribution of power to multiple applications.

In an embodiment, virtualized application power budgeting can distinguish between priority applications and non-priority applications and reduce the power consumption to only non-priority applications when there are power consumption conflicts. In another embodiment, virtualized application power budgeting may be able to determine the most efficient manner of providing power to each application in a data center. Further, virtualized application power budgeting may be able to distribute power according to application priority and other predetermined requirements and improve the efficiency of the power consumption by the devices in the data center.

In one embodiment, virtualized application power budgeting comprises one or more controllers monitoring and controlling a plurality of tiers. As a non-limiting example, a data center controller may determine the current overall power available to the data center. Known power consumption of the data center, such as, for example, infrastructure, the HVAC system, lighting and the like may be dynamically subtracted from the total available power. The remaining available power may be divided among one or more applications according to one or more predetermined rules. A set of controllers where each controller is allocated to an application, each of the set called a second controller, each second controller may map each application to determine the tiers of the application and power may be distributed to each tier. A third controller may exist within each tier of an application and monitor the tier/tiers of the application to determine a peak output according to a metric, such as processing for the level of power consumption, of each tier. Each tier may have one or more virtual machines running a portion of the application on one or more computing devices. A virtual machine level control system may monitor a metric associated with each virtual machine and the power consumption or the DVFS (Division Voltage and Frequency Scaling) of each virtual machine/processor. Feedback loops to each of the controllers at each of the above described levels may provide information to the controller, which in turn may be used to provide feedback for a controller further up the chain. In one embodiment, the above structure may be used to monitor, track, optimize, and prioritize the power consumption of one or more applications. The applications may be associated with other metrics, such as priority, or cost which may further influence the distribution of power.

In an embodiment, a first virtual machine may be running on a computing device. The virtual machine may have running on it, a portion of an application. As will be understood by a person having ordinary skill in the art, applications may run on hundreds or even thousands of virtual machines. In accordance with the present disclosure, the virtual machine may have a controller that monitors metrics associated with the computer hardware/firmware and the power consumption of the virtual machine. The controller may be able to alter the power consumption of the application by reallocating resources, down throttling the CPU or DVFS of processors associated with virtual machines, reducing the amount of time a scheduler provides to a virtual machine, and/or by changing the clocking of a CPU and the like. As another example, power may be monitored and controlled by adding or subtracting virtual machines allocated for the application.

In an embodiment, there may be a plurality of virtual machines. Each virtual machine may be running a portion of an application and, as noted above, each virtual machine may be managed and monitored by a controller. The plurality of virtual machines, along with their total power consumption and computing function according to one or more metrics may be managed and monitored. As one example, this plurality of virtual machines represents a tier, where a tier is a portion of an application, such as, for example, the front end, the middleware, or the back end. Power may be distributed to each virtual machine monitored by the controller according to the processing requirements of the application, the tier, the data center, the virtual machine, and/or the particular computing device running the machine. As another example, virtual machines may be added and subtracted to increase or decrease the computing resources and/or power usage associated with a tier, data center, application and the like.

In one embodiment, a data center controller operates at a first level, overseeing the distribution of power to each application running in the data center. Several factors may be included in determining the amount of power that each application running in a data center is allocated. In such an embodiment, the data center controller may take into account one or more factors, such as data center external resource power consumption. One example of external resource power consumption may be a HVAC system, or lighting costs, or any other power consumption not attributable to the data center computational functions. The controller may also take into account the priority of each application, the monthly budget for each application, the size, peak allowable consumption, or any other factors related to the application. In addition, the controller may take into account feedback from other layers of the application, such as the tier layer, the computing device layer, the processor layer, the core layer and so forth. In an embodiment, the controller determines the amount of power allocated to each application at a given point in time or for a given period. The data center controller may update the distribution on a continuous or scheduled basis.

In an embodiment, an application controller may operate for each application, at the application level. For example, computing applications may have a front end, middleware and a back end, each of which may represent one or more tiers. In a simple instance, the front end of the application may be operating on a first virtual machine on a first computing device, the middleware on a second virtual machine on a second computing device and the back end on a third virtual machine on a third computing device. The application controller may facilitate the distribution of the power received by the application as determined by the application controller. The distribution may be, for example, 33.3% of the power for each of the first, second, and third computing devices. Any other distribution may also be used and this level of controller may optimize the application based on the power requirements of each tier. For example, should one tier require 10% of the power allocated by the application controller, the other tiers may divide up the remaining power in such a way to maximize the output of the application according to one or more metrics. In order to facilitate the optimization of the application at the tier level, information from one or more sources may be provided to the tier controller in the form of rules, feedback, requirements, and the like.

DETAILED DESCRIPTION OF ILLUSTRATIVE EMBODIMENTS

As used herein, data centers may be a facility comprising a plurality of computing devices. Data centers may comprise server farms, processing locations, cloud server facilities, computing facilities and the like. Although the term data centers is used, a person having ordinary skill in the art will recognize that the present disclosure is not limited to a particular type of facility or location, but that in general, any one or more computing devices may be monitored and controlled as described herein to manage the power usage of multiple applications running on the computing device.

In an embodiment, there is a hierarchy of controllers. It will be understood by a person having ordinary skill in the art that while the controllers may be described separately for each of the levels of the hierarchy, it is not necessary that the controllers be separate or that they exist as distinct computing devices in separate locations. Rather, a single controller could be controlling each level in a hierarchical structure, or, conversely, any number of computing devices, virtual machines, hypervisors, schedulers, applications, hardware/firmware structures and the like may be controlling one or more of the hierarchical levels described.

In an embodiment, there is described a hierarchy of one or more levels. It will be understood by a person having ordinary skill in the art that the number of levels in a hierarch may be any number including 1, 2, 3, 4 . . . , 10, . . . 100 etc. and that the levels may be combined or further divided into a plurality of other levels. The levels may be determined by physical structure, location, software functionality, rules, database structures, or any other means of providing structure to one or more applications having one or more tiers running on one or more computing devices.

Figure 1:
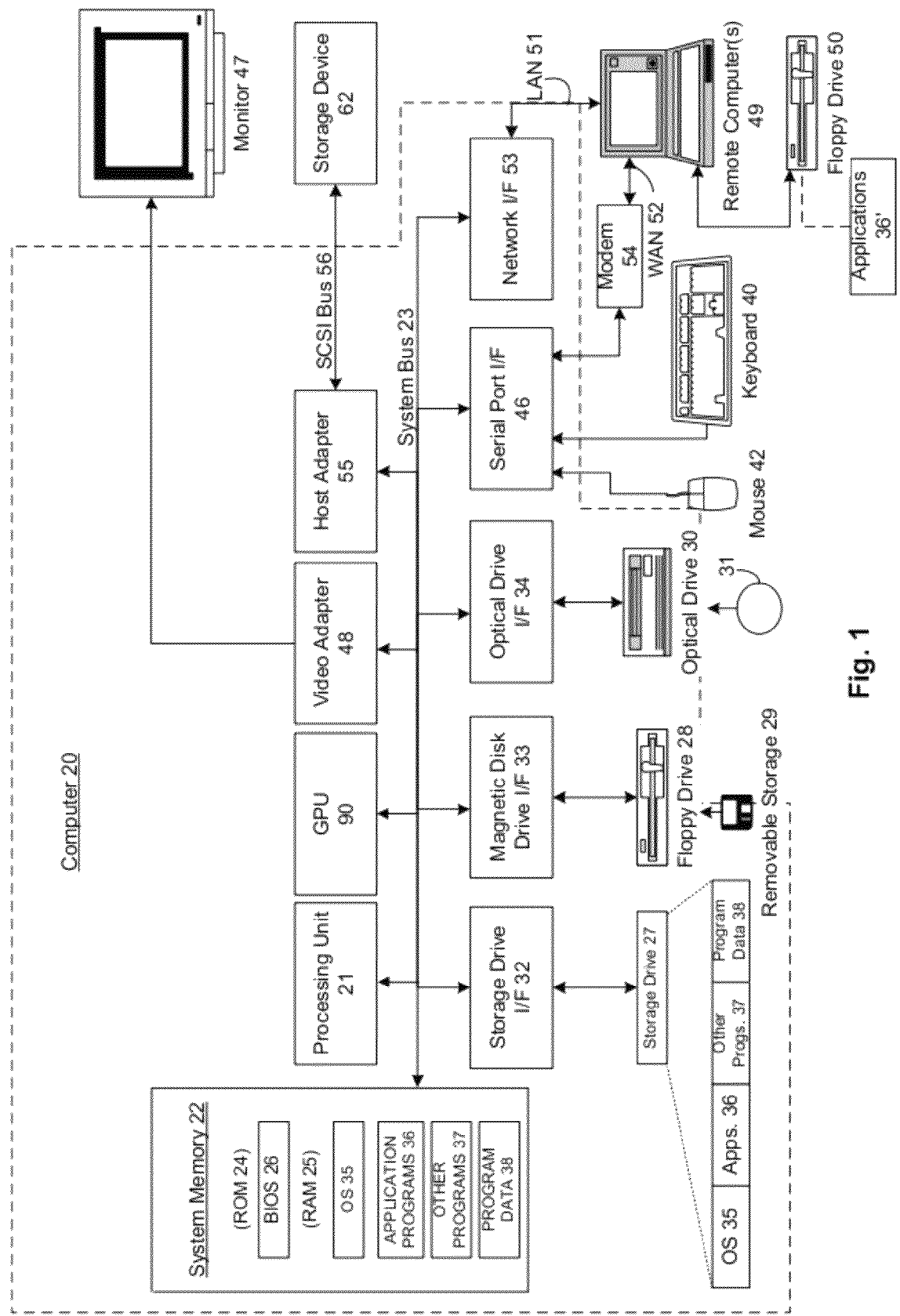
FIG. 1 depicts an exemplary computing system 100.

The disclosed embodiments may use one or more computer systems. FIG. 1 and the following discussion are intended to provide a brief general description of a suitable computing environment in which the disclosed subject matter may be implemented.

FIG. 1 depicts an example general purpose computing system. The general purpose computing system may include a conventional computer 20 or the like, including processing unit 21. Processing unit 21 may comprise one or more processors, each of which may have one or more processing cores. A multi-core processor, as processors that have more than one processing core are frequently called, comprises multiple processors contained within a single chip package.

Processor(s) can be configured by instructions loaded from memory, e.g., RAM, ROM, firmware, and/or mass storage, embodying logic operable to configure the processor to perform a function(s). In an example embodiment, where circuitry includes a combination of hardware and software, an implementer may write source code embodying logic that is subsequently compiled into machine readable code that can be executed by hardware.

Computer 20 may also comprise graphics processing unit (GPU) 90. GPU 90 is a specialized microprocessor optimized to manipulate computer graphics. Processing unit 21 may offload work to GPU 90. GPU 90 may have its own graphics memory, and/or may have access to a portion of system memory 22. As with processing unit 21, GPU 90 may comprise one or more processing units, each having one or more cores.

Computer 20 may also comprise a system memory 22, and a system bus 23 that communicative couples various system components including the system memory 22 to the processing unit 21 when the system is in an operational state. The system memory 22 can include read only memory (ROM) 24 and random access memory (RAM) 25. A basic input/output system 26 (BIOS), containing the basic routines that help to transfer information between elements within the computer 20, such as during start up, is stored in ROM 24. The system bus 23 may be any of several types of bus structures including a memory bus or memory controller, a peripheral bus, or a local bus, which implements any of a variety of bus architectures. Coupled to system bus 23 may be a direct memory access (DMA) controller 80 that is configured to read from and/or write to memory independently of processing unit 21. Additionally, devices connected to system bus 23, such as storage drive I/F 32 or magnetic disk drive I/F 33 may be configured to also read from and/or write to memory independently of processing unit 21, without the use of DMA controller 80.

The computer 20 may further include a storage drive 27 for reading from and writing to a hard disk (not shown) or a solid-state disk (SSD) (not shown), a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are shown as connected to the system bus 23 by a hard disk drive interface 32, a magnetic disk drive interface 33, and an optical drive interface 34, respectively.

The drives and their associated computer-readable storage media provide non-volatile storage of computer readable instructions, data structures, program modules, and other data for the computer 20. Although the example environment described herein employs a hard disk, a removable magnetic disk 29 and a removable optical disk 31, it should be appreciated by those skilled in the art that other types of computer readable media which can store data that is accessible by a computer, such as flash memory cards, digital video discs or digital versatile discs (DVDs), random access memories (RAMs), read only memories (ROMs) and the like may also be used in the example operating environment. Generally, such computer readable storage media can be used in some embodiments to store processor executable instructions embodying aspects of the present disclosure. Computer 20 may also comprise a host adapter 55 that connects to a storage device 62 via a small computer system interface (SCSI) bus 56.

A number of program modules comprising computer-readable instructions may be stored on computer-readable media such as the hard disk, magnetic disk 29, optical disk 31, ROM 24 or RAM 25, including an operating system 35, one or more application programs 36, other program modules 37, and program data 38. Upon execution by the processing unit, the computer-readable instructions cause actions described in more detail below to be carried out or cause the various program modules to be instantiated. A user may enter commands and information into the computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the INTERNET. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly wellsuited for computerized systems, nothing in this document is intended to limit the disclosure to such embodiments.

In an embodiment where computer 20 is configured to operate in a networked environment, OS 35 is stored remotely on a network, and computer 20 may netboot this remotely-stored OS rather than booting from a locally-stored OS. In an embodiment, computer 20 comprises a thin client where OS 35 is less than a full OS, but rather a kernel that is configured to handle networking and display output, such as on monitor 47.

Figure 2:
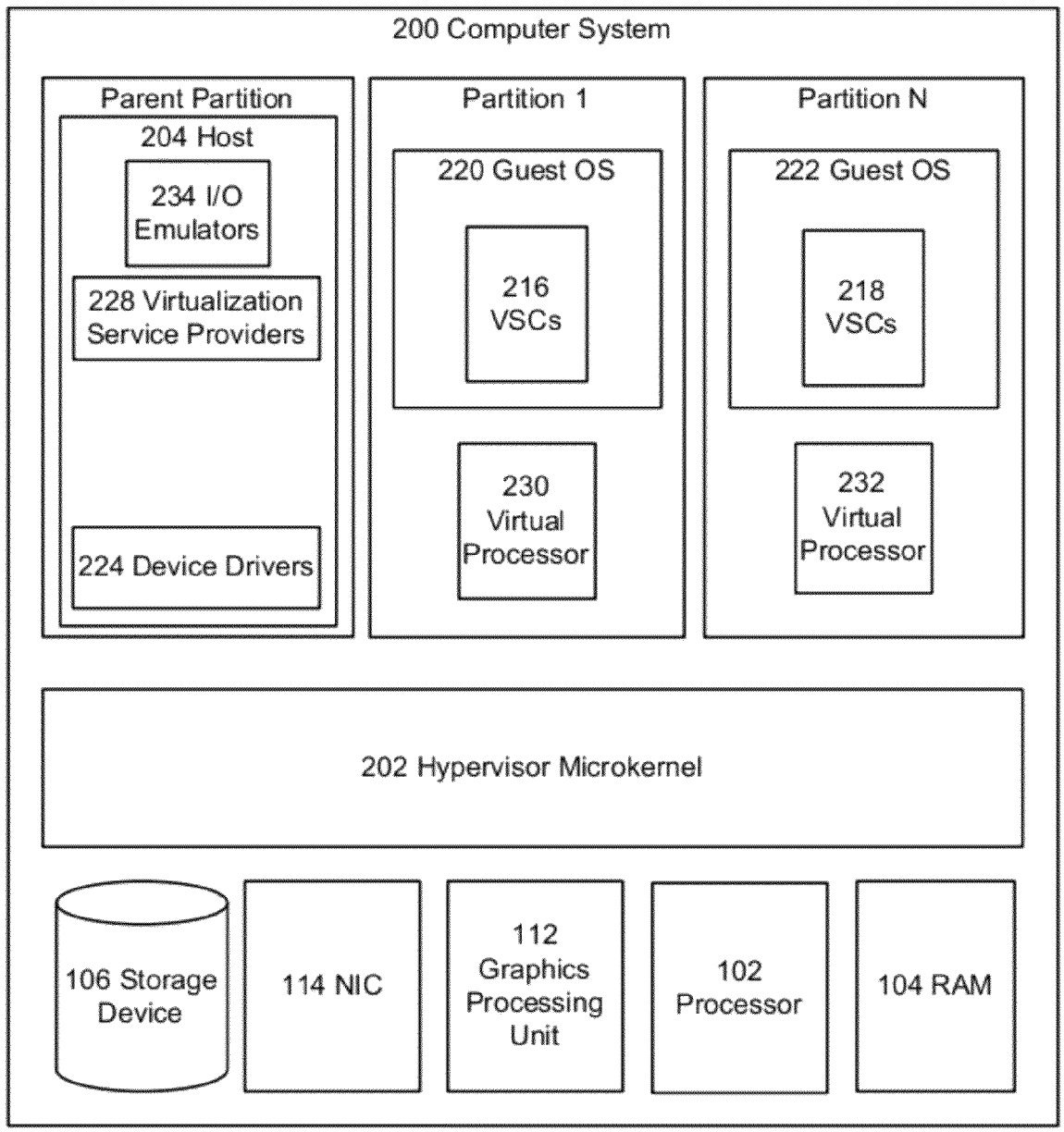
FIG. 2 depicts an exemplary virtualization platform that can be used to generate virtual machines.

The computer system 20 of FIG. 1 may have one or more virtual machines operating on the hardware and which may control and utilize the hardware described in FIG. 1. FIG. 2 depicts a virtualization platform that may run on a computing device such as the device shown in FIG. 1. In one embodiment, one or more virtual machines may operate on one or more computing devices in, for example, a data center. Virtual machines may monitor or may be monitored such that the power consumption of the virtual machine, regardless of what hardware it is running on, may be determined. It is therefore possible to determine the power consumption of the virtual machine regardless of what hardware the virtual machine runs on, or what portion of the hardware the virtual machine utilizes. According to the principles of virtualized application power budgeting, the usage of power can be altered if one knows the power used by each virtual machine and how each virtual machine uses power.

Turning to FIG. 2, illustrated is an exemplary virtualization platform that can be used to generate virtual machines. In this embodiment, hypervisor microkernel 202 can be configured to control and arbitrate access to the hardware of computer system 200, which may be computer 20, referring back to FIG. 1. Hypervisor microkernel 202 can generate execution environments called partitions such as child partition 1 through child partition N (where N is an integer greater than 1). Here, a child partition is the basic unit of isolation supported by hypervisor microkernel 202. Hypervisor microkernel 202 can isolate processes in one partition from accessing another partition's resources. Each child partition can be mapped to a set of hardware resources, e.g., memory, devices, processor cycles, etc., that is under control of the hypervisor microkernel 202. In embodiments hypervisor microkernel 202 can be a stand-alone software product, a part of an operating system, embedded within firmware of the motherboard, specialized integrated circuits, or a combination thereof.

Hypervisor microkernel 202 can enforce partitioning by restricting a guest operating system's view of the memory in a physical computer system. When hypervisor microkernel 202 instantiates a virtual machine, it can allocate pages, e.g., fixed length blocks of memory with starting and ending addresses, of system physical memory (SPM) to the virtual machine as guest physical memory (GPM). Here, the guest's restricted view of system memory is controlled by hypervisor microkernel 202. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system may virtualize guest physical memory. Virtual memory is a management technique that allows an operating system to over commit memory and to give an application sole access to a contiguous working memory. In a virtualized environment, a guest operating system can use one or more page tables to translate virtual addresses, known as virtual guest addresses into guest physical addresses. In this example, a memory address may have a guest virtual address, a guest physical address, and a system physical address.

In the depicted example, parent partition component, which can also be also thought of as similar to domain 0 of Xen's open source hypervisor can include a host 204. Host 204 can be an operating system (or a set of configuration utilities) and host 204 can be configured to provide resources to guest operating systems executing in the child partitions 1-N by using virtualization service providers 228 (VSPs). VPSs 228, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in that they may be supplied with a hypervisor, not with a guest. In an exemplary embodiment the path used to by virtualization service providers 228 to communicate with virtualization service clients 216 and 218 can be thought of as the virtualization path.

As shown by the figure, emulators 234, e.g., virtualized IDE devices, virtualized video adaptors, virtualized NICs, etc., can be configured to run within host 204 and are attached to resources available to guest operating systems 220 and 222. For example, when a guest OS touches a memory location mapped to where a register of a device would be or memory mapped device, microkernel hypervisor 202 can intercept the request and pass the values the guest attempted to write to an associated emulator. Here, the resources in this example can be thought of as where a virtual device is located. The use of emulators in this way can be considered the emulation path. The emulation path is inefficient compared to the virtualized path because it requires more CPU resources to emulate device than it does to pass messages between VSPs and VSCs. For example, the hundreds of actions on memory mapped to registers required in order to write a value to disk via the emulation path may be reduced to a single message passed from a VSC to a VSP in the virtualization path.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to processors of the computer system such that the instructions that effectuate the virtual processors will be backed by processors. Thus, in an embodiment including multiple processors, virtual processors can be simultaneously executed by processors while, for example, other processor execute hypervisor instructions. The combination of virtual processors and memory in a partition can be considered a virtual machine.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 3:
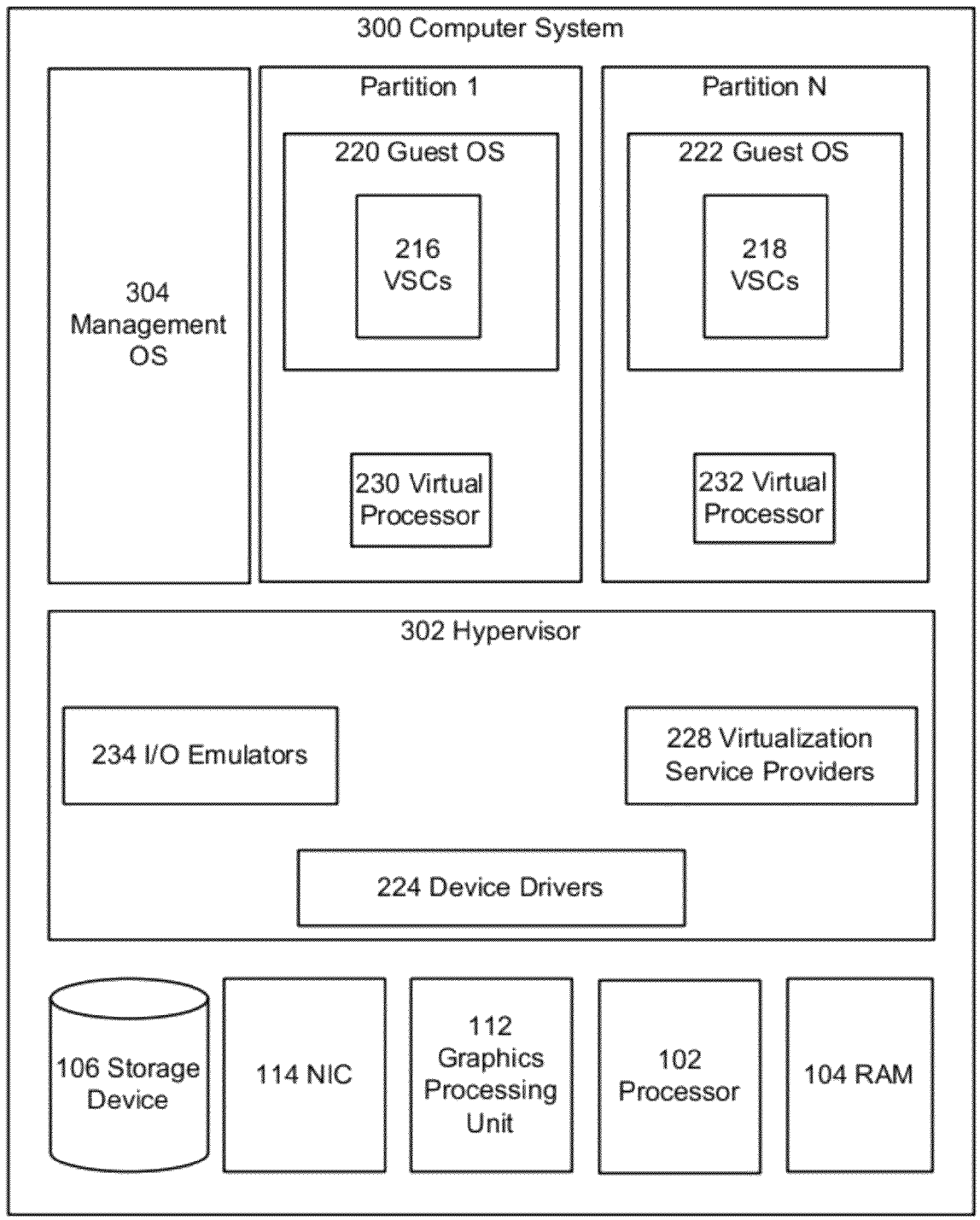
FIG. 3 depicts an alternative virtualization platform to that described above in FIG. 2.

Referring now to FIG. 3, it illustrates an alternative virtualization platform to that described above in FIG. 2. FIG. 3 depicts similar components to those of FIG. 2; however, in this example embodiment hypervisor 302 can include a microkernel component and components similar to those in host 204 of FIG. 2 such as the virtualization service providers 228 and device drivers 224, while management operating system 304 may contain, for example, configuration utilities used to configure hypervisor 302. In this architecture, hypervisor 302 can perform the same or similar functions as hypervisor microkernel 202 of FIG. 2; however, in this architecture hypervisor 304 can be configured to provide resources to guest operating systems executing in the child partitions. Hypervisor 302 of FIG. 3 can be a stand alone software product, a part of an operating system, embedded within firmware of the motherboard or a portion of hypervisor 302 can be effectuated by specialized integrated circuits.

Figure 4:
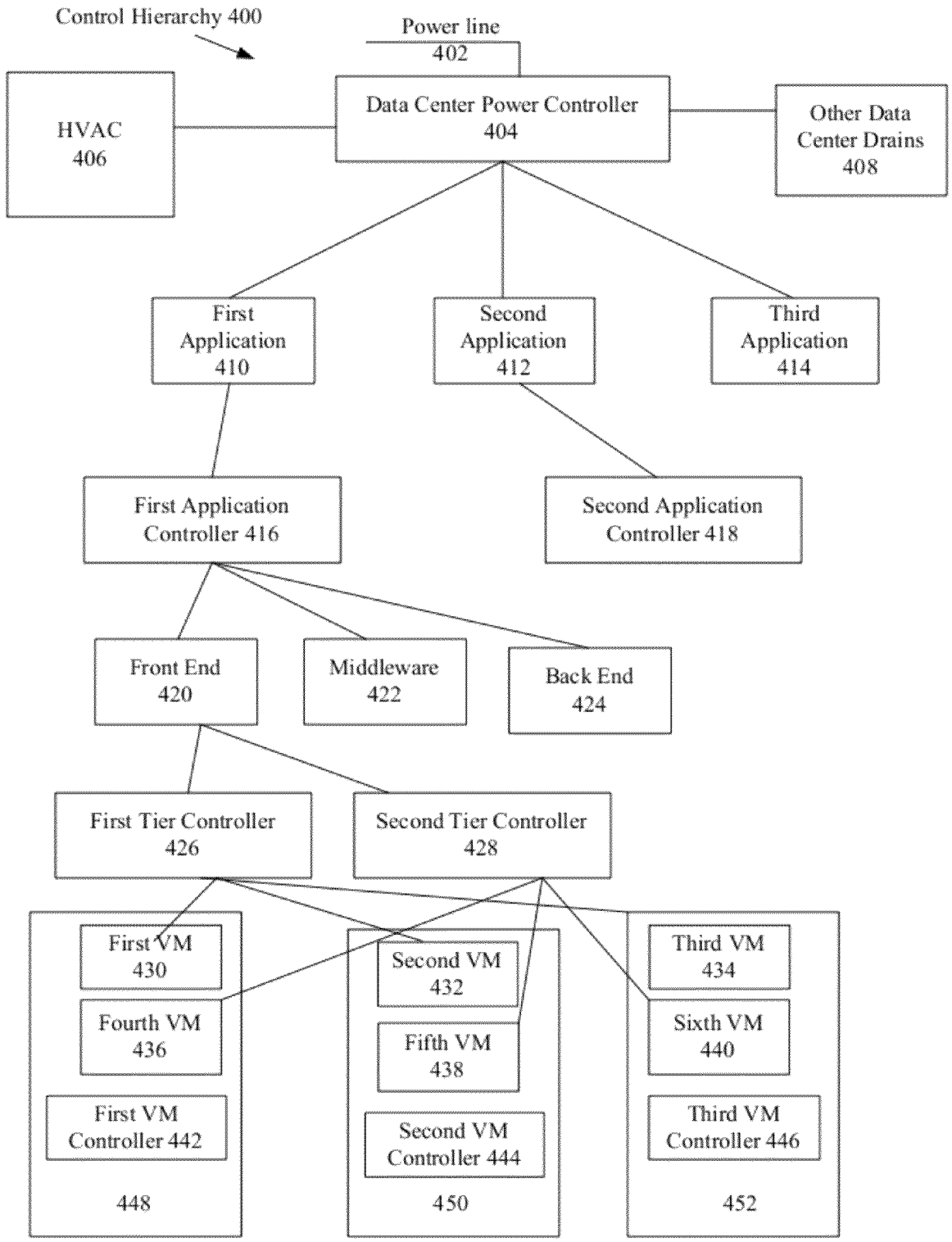
FIG. 4 depicts an example of a hierarchy in virtualized application power budgeting.

FIG. 4 depicts an exemplary hierarchy for implementing virtualized application power budgeting. It should be understood that the connecting lines in the drawing may represent the reciprocal flow of one or more of logic, information or power. The connecting lines are not exhaustive, because, each controller may be connected to any other controller. In addition, it will be understood that while a four layer hierarchy is depicted, such a layout is not necessary.

Generally, FIG. 4 is an example representation of a data center power and control hierarchy 400 where the data center is monitored and managed by an embodiment of virtualized application power budgeting. Using such as structure of control can provide numerous benefits for a data center. For example, the total power in can be divided up amongst applications. Each application can be fine tuned at the tier level to run an application in an efficient manner, and controllers at the VM level provide sufficient granularity to power down specific applications, specific tiers of applications and specific VMs such that the applications run efficiently, such that critical applications need not be powered down and such that critical portions of applications need not be powered down either.

Power line in 402 is indicative of the total power available to a data center and may represent the power available to the data center as received from, for example a power plant, power station, transformer, substation or the like. This may be the actual power line in or it may be information related to the total power available to the data center.

Data center power controller 404 may receive information related to the total power in from power line 402. This information may be dynamic such that changes in the power available to the data center are reflected in information received by data center power controller 404. The data center power controller 404 may be configured to receive information from other systems in the data center, such as the heating and cooling units (HVAC 406) and other data center power drains 408. Other data center power drains may include lighting, security systems, pumps, monitoring devices, and computing devices, and, in one embodiment, may include base power consumption from computing devices, such as servers running data center applications. The data center power controller 404 may use the information from the power line, the HVAC and the other power drains 408 to determine the amount of power remaining for use in running applications, such as, for example first application 410, second application 412, and third application 414.

Data center power controller 404 may monitor and manage the power available to and used by the hardware and software associated with first application 410, second application 412, and third application 414. Although three applications are depicted, one having ordinary skill in the art will understand that there can be any number of applications running in a data center. Accordingly, it will be understood that the number and format of the applications depicted is intended as a representative and non-limiting example. In an embodiment, the data controller 404 may receive information from any number of applications related to the power consumption of each application and the utilization of resources by each application.

In one embodiment, data center power controller 404 divides up the power among the one or more applications according to the power requests/needs for running of each application and, as one example, for optimizing performance of the one or more applications. Accordingly, information related to the division of power to each application may be sent from the data center power controller 404 to any other system or application involved in virtualized application power budgeting. Nevertheless, there are situations where the total power requests of the one or more applications in a data center are greater than the total power available to the one or more applications. As such, it is necessary for the data center power controller be configured to divide the power among the one or more applications. This may be done according to a predetermined set of rules. These rules may be related to the priority of a particular application, the cost of power, the time of day, the types of requests, the total power, required minimums of power or any other rule that can be used in determining the resolution of conflicts between one or more applications requesting power.

In an embodiment, each application has associated therewith, an application controller. The controller may be a proportional integral differential ("PID") controller or any other controller known in the art and may represent software running on a computing device such as the device shown in FIG. 1, or it may be hardware. For example, first application 410 has associated therewith first application controller 416 and second application 412 has associated therewith second application controller 418. It will be understood that although not depicted, third application 414 may be associated with a third application controller and that any application running in the data center may be associated with an application controller. In addition, although depicted as individual entities, the first application controller 416 and the second application controller 418 may be running on the same computing device, on separate devices, on the same device as the data center power controller or any other computing device. In general the application data controllers 416 and 418 will be able to send and receive information to and from any of the other controllers and computing devices related to the data center.

In an embodiment, first application controller 416 receives information related to the amount of power designated for use by first application 410. This may be received from the data center power controller 404. The first application controller may be configured to divide the total power designated for the first application 410 according to tiers. As one non-limiting example, the tiers may be portions of an application that have particularized function and/or have specific computing device hardware resource requirements. Some applications use a tier structure comprising a front end 420, middleware 422 and a back end 424. This is just one example and, even in applications that use a front end, middleware and back end, the division of the application into tiers by the controller need not be based on these designations. It may be possible to break an application into any number of tiers.

In an embodiment, the first application controller 416 controls the first application 416 with three tiers 420, 422 and 424. The controller may send information and or instructions indicative of the power available to each of the tiers of the application 420, 422 and 424. The division of power to each tier need not be static, nor does it need to the same for each tier. In one embodiment, the division of power could be 10% to the front end 420, 40% to the middleware 422 and 50% to the back end 424. Regardless of the division, the first application controller may be configured to receive information related to the power requests/requirements of each tier and the computing function of each tier. This information may be received in the form of metrics and can be received from any controller or computing device associated with the data center.

In an embodiment, the first application controller may receive information from each of the front end 420, middleware 422 and back end 424 which indicates that, for example, the front end is using too much power and that the middleware is not using its allotted power. In such an example, the first application controller 410 may reduce the amount of power allocated to the front end, reallocate a portion of that power to the back end and reallocate a portion to the middleware to find an optimal efficiency point for the application. It is possible that based on the loads on the application, one or more tiers might, at different times, be over or under using power. As such, information may be received and changes may be made in the power allocation on a continuous or near continuous basis such that the changes are dynamic.

In another embodiment, virtualized application power budgeting may comprise one or more tier controllers such as, for example, first tier controller 426 and second tier controller 428. It will be understood that any other tier, including back end tier 424, or any other tier of an application may have associated therewith, a tier controller.

A tier controller may be configured to monitor and manage information, feedback, power and the like between computing devices in a data center. As an example, each tier controller may receive information from one or more computing devices, each computing device running one or more virtual machines, such as, for example, first VM 430, second VM 432 and/or third VM 434. It will be understood that first tier controller 426 and second tier controller 428 may each receive information from the same computing devices, each running VMs associated with the particular tier of the application.

In an embodiment, the first tier controller 426 may provide instructions to each of the computing devices 448, 450 and 452, which are computing devices as depicted in FIG. 1 or from each VM, which is a virtual machine as described above in FIGS. 2-3. The instructions may include instructions for adding or removing a virtual machine, instructions to reduce or increase the clocking rate of the computing system, and/or instructions for increasing or decreasing the allocation of computing resources on the computing device. In addition, the first tier controller may receive information from the computing devices 448, 450 and 452 related to the allocation and/or misallocation of resources, the power requirements of the computing device, the startup or shutdown of one or more VMs, one or more metrics related to the performance of the VM or the computing device and the like.

In another embodiment, the first tier controller may receive instructions from a controller elsewhere in the data center. Instructions and information may be received from the application controllers, from the data center controllers and from the VM controllers. Information may be sent from the tier controllers to any other controllers as well.

Each computing device 448, 450 and 452 may be associated with a VM controller, such as, for example, first VM controller 442, second VM controller 444 and third VM controller 446. Although depicted as operating on the specific computing devices, it is not necessary that each VM controller be running on the same computing device that is running the virtual machines that the VM is controlling. In one embodiment, there is only one VM controller monitoring a plurality VMs on a plurality of computing devices. In another embodiment, the VM controller may be associated with a Hypervisor running on the computing device, or it may be running as a separate application on a computing device. In general, however, the VM controller may monitor and manage information related to computer hardware, firmware, power, scheduling, resources and processing associated with the VMs running applications in a data center.

First VM controller 442 may receive instructions from one or more tier controllers, as well as from one or more application controllers and/or data center controllers. First VM controller 442 may send information to any of these controllers as well. In one embodiment, power allocated through the hierarchy for the first VM 430 may be implemented and monitored by the first VM controller.

First VM controller 442 may receive information from an application, a tier, or a data center controller the information including instructions, data or information related to the amount of power available to a particular VM or application. First VM controller may also receive information from each of the one or more virtual machines running on a computing device, the information related to the computing resources dedicated to each VM, and/or metrics associated with the performance, power usage, and resource requirements of each VM. For example, First VM controller 442 may receive information from first VM 430 and fourth VM 436. The information may be the amount of power usage by each VM. In another embodiment, the information may be associated with the clocking speed of the CPU for the VM running on the computing device. DVFS may also be determined. As another example, the information may by related to the CPU usage, the disk/drive usage, the amount of dedicated resources associated with the VM, or any other metric that may be associated with the computing device usage and power consumption of the VM.

In a further embodiment a VM controller may be able to provide data and instructions to each particular VM via a host operating system running on the processor, through a hypervisor and the like in order to configure the power consumption of each VM. For example, first VM controller 442 may be able to provide an instruction to first VM 360 indicating that first VM 360 needs to reduce power consumption. In such an example, the instruction may have associated with it a way of reducing power, such as, for example, reducing clocking speed, CPU usage, resources on the computing device dedicated to the machine, turning the VM off completely or the like. In another embodiment, first VM controller may provide an instruction to first VM 360, the instruction including an indication that power consumption and/or device usage should increase. In such an embodiment, first VM 360 may include an increase in dedicated resources of the computing device, the clocking may increase, more processing power may be associated with the VM, a new VM may be added and/or any other means of increasing power consumption of a VM. Accordingly, each VM may be managed by a VM controller in such a way that the power consumption of particular VMs may be understood and controlled.

As noted above in the descriptions of the data center controller, the application controllers, and the tier controllers, the total power available to the data center may be divided up among a plurality of applications. The structure set up and described above provides a way to divide up the power dedicated for each application with high granularity. As such, an application controller can selectively power down portions of an application. In embodiment, a selective power down instruction may be translated by the tier and VM controllers to only power down the selected portions of the application.

Figure 5:
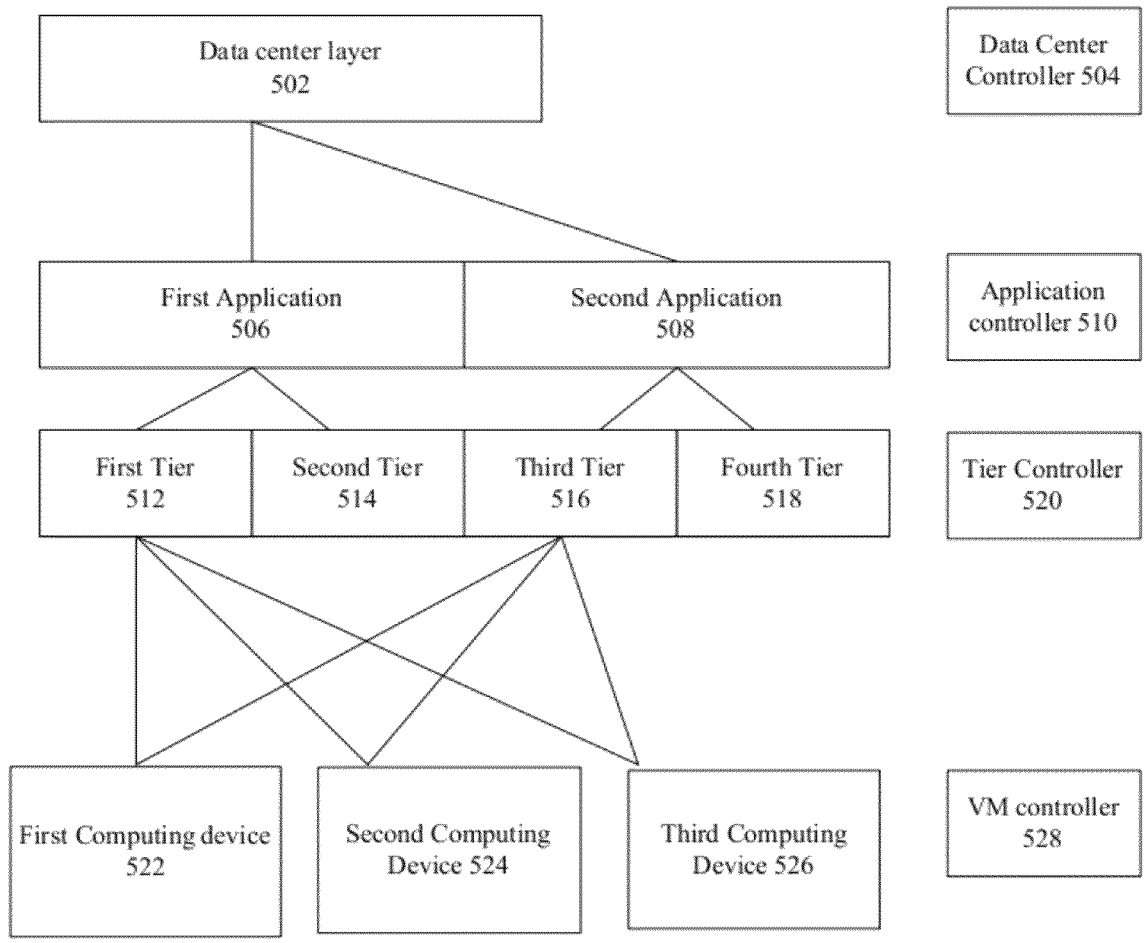
FIG. 5 depicts a further example of a hierarchy in virtualized application power budgeting.

FIG. 5 depicts a further example of a hierarchy, where each layer, including the Data center layer 502, the application layer, the tier layer and the computing device/VM layer has associated therewith, a controller. A person having ordinary skill in the art will understand that FIG. 5 is non limiting. Further although the hierarchy depicts four layers, this construction is just an example and is not limiting. Accordingly, creating a scalable hierarchy for virtualized application power budgeting does not require a specific number of layers but one example including four layers is depicted in FIG. 5.

In FIG. 5, the data center layer 502 may include information related to the data center, including but not limited to the total power available, the total power available to the applications, and the other data center power drains like heating and cooling. In addition, the data center layer 502 may have information related to the number of applications running in each data center. The data center layer 502 may be associated with data center controller 504. The data center controller 504 may have information associated with the division of power amongst a plurality of applications, such as first application 506 and second application 508. The data center controller may comprise or have stored therein one or more rules to resolve conflicts in power requests. In addition, information related to the critical nature of one or more tiers of applications, or of one or more applications themselves may be stored or otherwise determined by data center controller 504.

Generally, data center controller 504 may have stored thereon instructions, rules, information and data necessary to divide power between a plurality of applications. Further, data center controller 504 may receive information from other controllers and from the applications to further provide feedback on the performance of the application. For example, feedback indicating the efficacy of the power distribution, the effect on particular applications of further power reductions to the application, delay in application responses, queued data and the like may be provided as information, data, and or instructions to data center controller 504.

As noted above with respect to FIG. 4, each data center may run one or more applications. In FIG. 5, these are depicted as first application 506 and second application 508. These applications may be associated with an application controller 510. The application controller may have information related to the architecture of the application stored thereon and may manage the flow of power to each tier in the architecture of the application. In one embodiment, the flow of power to each tier is managed such that there is a balanced distribution of power among the one or more tiers associated with an application. For example, if an application is allotted an increased amount of power by the data center controller 504, the application controller may attempt to increase the power available to the several tiers by allotting an equal percentage of power. For example, if there were ten tiers associated with the application, the application controller may initially increase the power available to each of the ten tiers by 10% each. Such a distribution, however, may not be efficient. A first tier, such as first tier 512 may need more than the allotted 10% of power and a second tier, such as second tier 514 may not need as much power. As such, the application controller may receive information about the distribution of power among the tiers and may redistribute power to improve the usage of power.

Each application may be associated with tiers, and although first application 506 is depicted as only associated with two tiers, 512 and 514, and second application 508 is also depicted as only associated with two tiers, 516 and 518, it will be understood that any number of applications and controllers can exist. Further although only one data center controller 504, one application controller 510, one tier controller 520 and one VM controller 528 are depicted, there can be any number of computing devices or controllers associated with each.

Each application may have tiers such as first tier 512 and second tier 514 and each tier may be associated with a tier controller 520. The tier controller may distribute power to each of the VM, and may send and receive information associated with the power consumption of each tier and each VM. As noted above, virtual machine power budgeting can be used to determine a balanced allocation of power to several tiers such that each tier receives a power allocation commensurate with the needs of the tier for operation in conjunction with the other tiers. The tier controller 520 may receive information from the other controllers and from each of the computing devices that may lead to allocating power commensurate with needs based on the usage level of the application.

VM controller 528 may be associated with first computing device 522, second computing device 524, and third computing device 526. Although not depicted, any number of computing devices may be associate with VM controller 528. Each computing device, such as, for example, first computing device 522, may have one or more VMs running on it. The VM controller 528 may manage and control the amount of power allocated to each VM and may further receive information related to the consumption of power by each VM.

Figure 6:
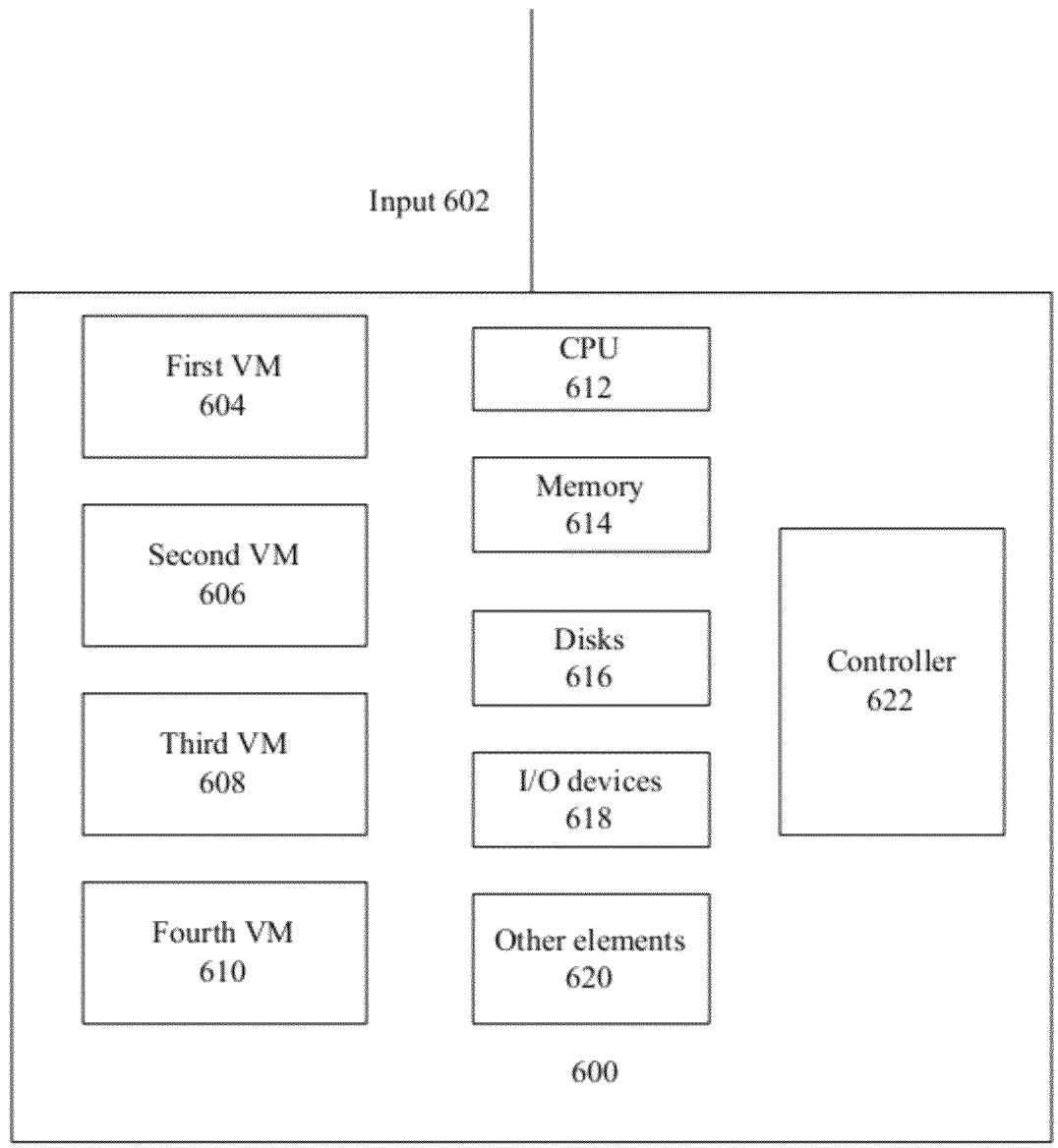
FIG. 6 depicts a sample computing device in a data center running multiple virtual machines.

FIG. 6 depicts an embodiment of a computing device 600, which may be the computing device depicted with respect to FIG. 1 having several virtual machines such as those depicted in FIGS. 2-3 running thereon, and, as a further example, a virtual machine controller 622. The computing device 600 may have an input 602 associated with the power for use by the computing device 600. In addition, an input 602 may be associated with instructions received from other controllers or with instructions for the controller 622.

The controller 622 may be used to divide up the resources of computing device 600, such as, for example, the CPU 612, the memory 614, the disks 616, the I/O devices 618 and the other elements of the computing device 620. These resources may be divided among the several virtual machines, first VM 604, Second VM 606, Third VM 608 and fourth VM 610. In an embodiment, the resources available may determine the number of virtual machines running on the computing device and the type of virtual machine running on the computing device 600.

For example, if a computing device is running a first virtual machine that uses a large percentage of the CPU and a small percentage of the memory, disks, I/O and other elements. It would be most efficient to put other VMs on the device that have lower CPU needs but that may have higher needs in other areas. In such a way the resources of the computing device may be more efficiently used.

It will be understood that while only four virtual machines are running on computing device 600 any number of VMs may be running on a computing device. In an embodiment, each VM may be associated with a different application, or, in another embodiment, multiple tiers of an application. Each virtual machine may require a certain power allocation and have a base power of the computing device associated with it. Information about the base power, the VM power usage and the usage of resources may be provided to the controller 622. The controller 622 may have control over each of the resources and over the VMs running on the computing device. As one example, the controller may be able to reallocate resources to each VM individually, or may be able to decrease the CPU usage, the clocking speed associated with VM processes, the DVFS and/or it may be able to remove a VM from a computing device 600 all together. As such, the controller may be able to increase or decrease the power associated with a VM at will, thereby providing granular control over the processing capability and power usage associated with an application.

Figure 7:
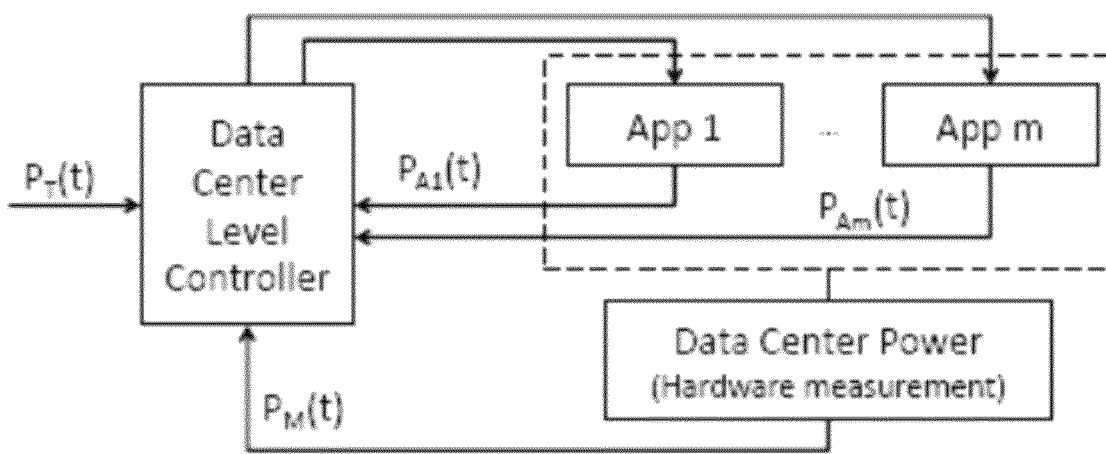
FIG. 7 depicts an example feedback loop for feedback for a data center controller.

FIG. 7 depicts a feedback loop associated with a data center controller which may be data center controller 504 or data center controller 404 as depicted above with respect to FIGS. 4-5.

FIG. 7 shows information from App1 through App m being feedback to the data center level controller. Further, data center power also provides usage information. In an embodiment, the data center power usage comprises the power usage of the data center not associated with application processing. This may include heating and cooling, lighting, pumps, ventilation, security and the like. Further still, the total power usage of the data center and App 1 through App m is depicted as $P_T(t)$.

It will be understood by a person having ordinary skill in the art that each application App 1-App M may be allocated an amount of power at a given point in time, but that several factors affecting applications may cause the power requirements of the application to change over time. If, for example, the application is associated with providing a web service and the number of requests for a particular service spikes, there may be an under allocation of power to the application. As such usage of the application may be one of the elements included in a feedback loop such as feedback loop depicted at FIG. 7. Further still, while this information with respect to usage was explained with respect to a single application, usage information may be provided dynamically from one or more of the applications running in the data center. Thus, the controller is receiving feedback from a plurality of applications on a real time basis.

Figure 8:
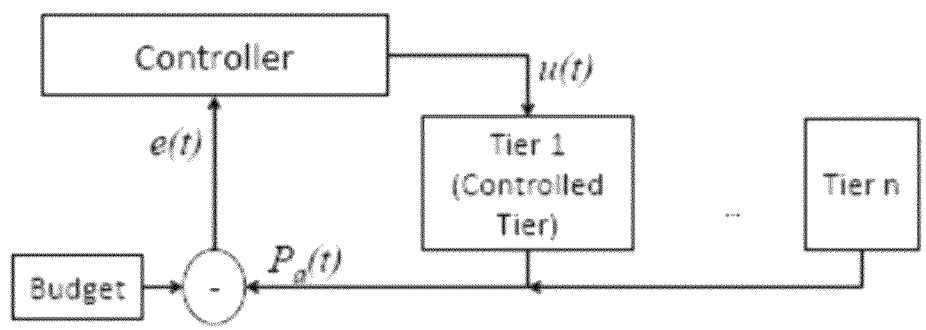
FIG. 8 depicts an example feedback loop for feedback to an application controller.

FIG. 8 depicts a feedback loop for an application level feedback controller. As noted above, applications may be divided into a number of tiers where each tier may have a different role, and consequently, different power requirements. The application level controller may divide the power received from the data center controller among the tiers. In an embodiment the controller determines the proportion of power to allocate to each tier. The application controller may receive information related to the power consumption profile of each tier at the various levels of consumption and use the profile to allocate power to each of the tiers when there is a change in the power requirements. As software related to an application changes or is updated, new profiles muse be learned. Accordingly, the information received from each tier may be received, stored and used in one or more ways to create one or more profiles of the tier power usage.

If there is a misallocation in the allocation among the tiers of an application, the application controller may receive feedback indicative of the over or under power allocation of each tier. This information may be used to revise a profile, change a stored database of information related to the application and to update the power provided to a tier.

Figure 9:
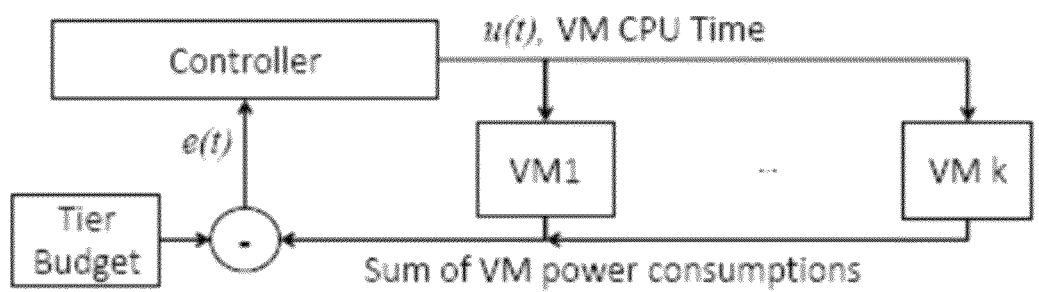
FIG. 9 depicts an example feedback loop for feedback to a tier controller.

FIG. 9 depicts a tier level controller feedback loop. In one embodiment, the tier level controller may receive information related to the power budget provided to a tier of an application, which may constitute the total budget to be divided up among several virtual machines, shown as VM1 . . . VMk in FIG. 9. In one embodiment, the tier controller may be able to control the DVFS or the CPU usage to indirectly change the virtual machine power usage.

Figure 10:
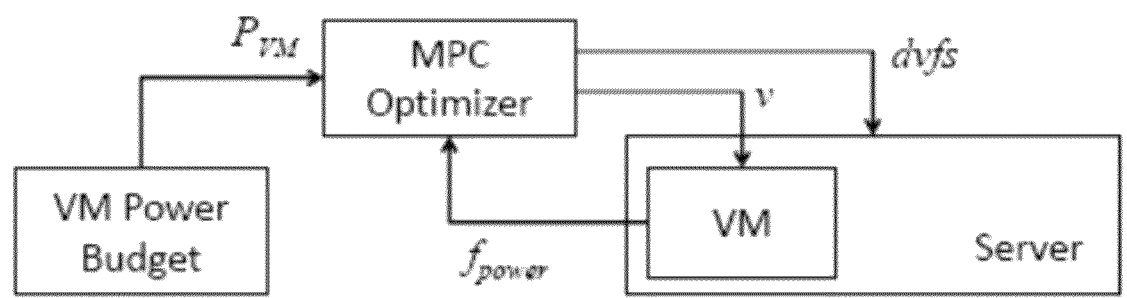
FIG. 10 depicts an example feedback loop for feedback to a computing device controller.

FIG. 10 depicts a feedback loop related to the virtual machine. DVFS, mentioned above may act at the hardware level and may not respect VM boundaries if there are multiple VMs running on a single computing device. Thus, this controller at the VM level may monitor and provide instructions to each VM via a host operating system or a hypervisor. Thus, by determining the amount of power usage each VM is supposed to be allocated, the controller may use one or more metrics, such as CPU usage, clocking, scheduling, DVFS and resource allocation to preserve the power budget for each of the several VMs running on the device.

In an embodiment, the data center controller may have allocated the power to each application based on the application demands and the controller may minimize the workload throttling of one or more applications in case of conflicts. Conflicts may be solved by any predetermined rule or set of rules which may be predetermined or that may be determined on the fly based on information in the feedback cycles. For example, priority, budget, cost, importance, or any other aspect associated with applications can be used to influence predetermined rules.

Figure 11:
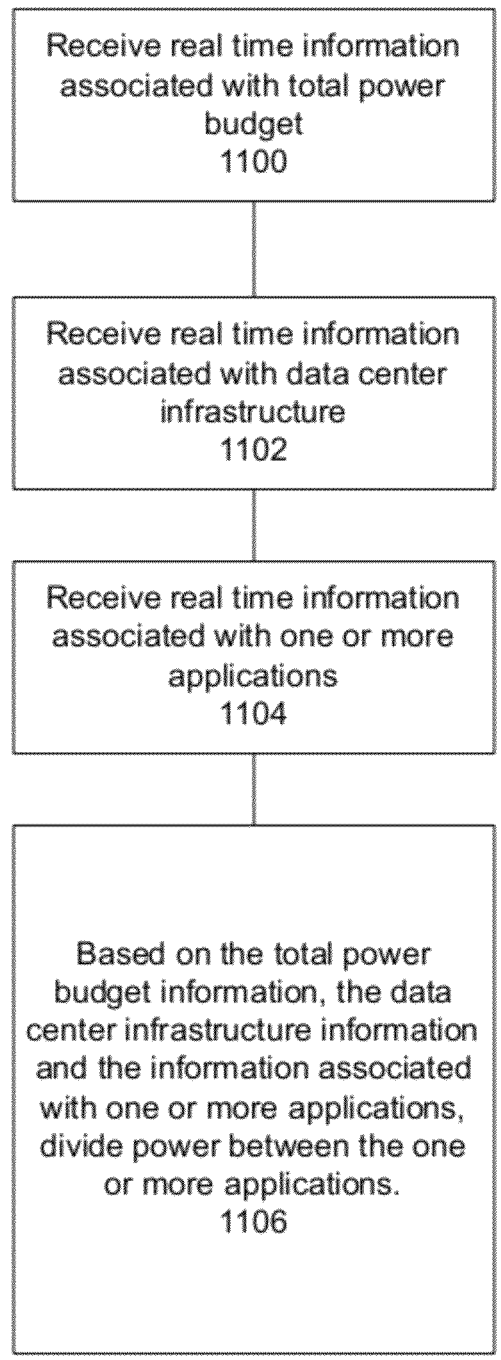
FIG. 11 depicts an example flowchart for virtualized application power budgeting for a data center controller.

FIG. 11 depicts an example flow chart for a data center layer controller. At step 1100, the controller may receive real time information associated with the total power budget available to the data center. This may be an amount that varies with the time of day, weather and the like and may be the amount of power received from a power station.

At step 1102, information related to the power requirements of the data center infrastructure may be received. In one embodiment, this may be all power consumption of the data center excluding the power required for processing to run applications in the data center. As a few non limiting examples, this may be infrastructure, heating and cooling, lighting, security, building maintenance, and, in one embodiment, base power consumption of servers and computing devices.

At step 1104, information related to one or more applications running in the data center may be received. This may include the number of applications, the priority of applications, the amount of power currently allocated to each application, whether each of the one or more applications is requesting additional power, what the maximum allocation level for the particular application is, the number of virtual machines running an application, the number of tiers of an application, the power for each VM or tier, whether there is a conflict for resources, the critical aspects of each application, the cost associated with running each application, a tab associated with each application, ownership, licensing information, contract information, a power profile or any other information related to the power consumption of the one or more applications.

At step 1106, the information at steps 1100, 1102, and 1104 may be used to determine the allocation of power to an application in real time. In one embodiment the allocation could be taking the total power, subtracting out the infrastructure costs and dividing up the remaining power according to the needs of the applications. In general, such an allocation would work until there are conflicts, after which, additional information as noted above may be used to further aid in the process to determine the allocation of power.

Figure 12:
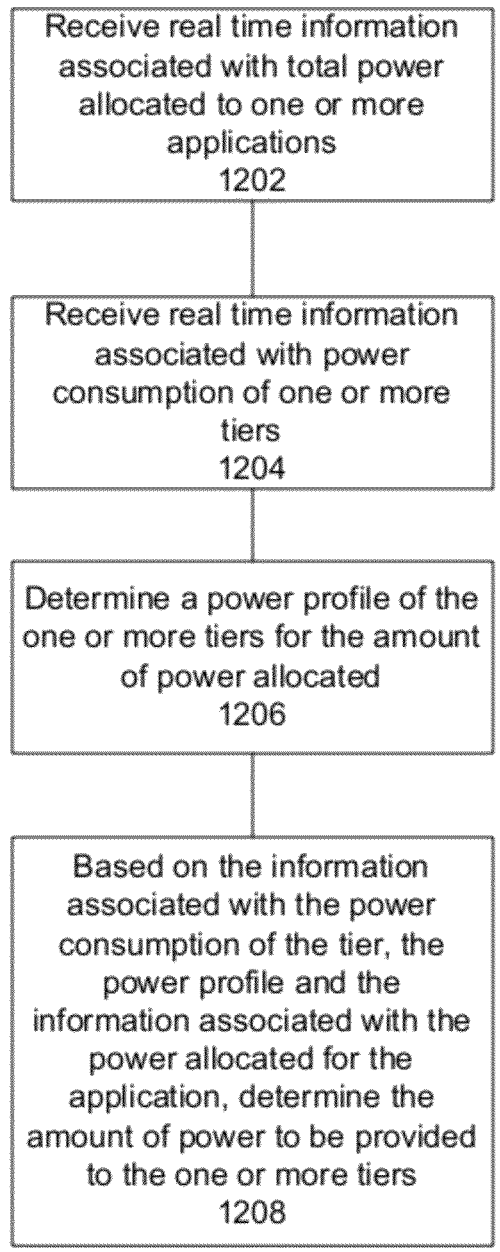
FIG. 12 depicts an example flowchart for virtualized application power budgeting for an application controller.

FIG. 12 depicts an example method of control by an application level controller. At step 1202, the application controller may receive real time information associated with the power budget allocated to the application. This may be received, in one embodiment, from the data center controller.

At step 1204, information related to the power consumption of one or more tiers of an application may be received. As noted above, tiers may represent functionality of an application, and each tier may have different power requirements. Accordingly, dividing an application up into tiers may provide an increase in the granularity of the control available to virtualized application power budgeting.

At step 1206, a power profile may be determined for the tiers of an application. This power profile may be the relative amounts of consumption of each tier for an application running at a certain capacity. For example, the power consumption of the tiers could be a linear increase in power requirements as the utilization of an application increases. A power profile would recognize and record this. One example would be if, for a utilization of 10% of an application, the power requirements for a specific tier was 10 W, then, for a utilization of 20% of an application, the power requirements for the specific tier would, in linear fashion, double. Most tiers, however, will not act in a strictly linear fashion, and therefore determining, recording and storing power profiles for each tier of an application may be useful to determine the amount of power to allocate.

At step 1208, the information from step 1202, 1204, and 1206 may be used to determine the amount of power to allocate for each tier. In one embodiment, the power profile may be used as a first allocation of power; however, feedback provided in real time may show that the power profile is not an exact match with the power requirements. Accordingly, real time feedback would influence a change in power allocation and could also update the power profile. Accordingly, a feedback loop may create a dynamic allocation of power that leads to efficient distribution on a tier basis.

Figure 13:
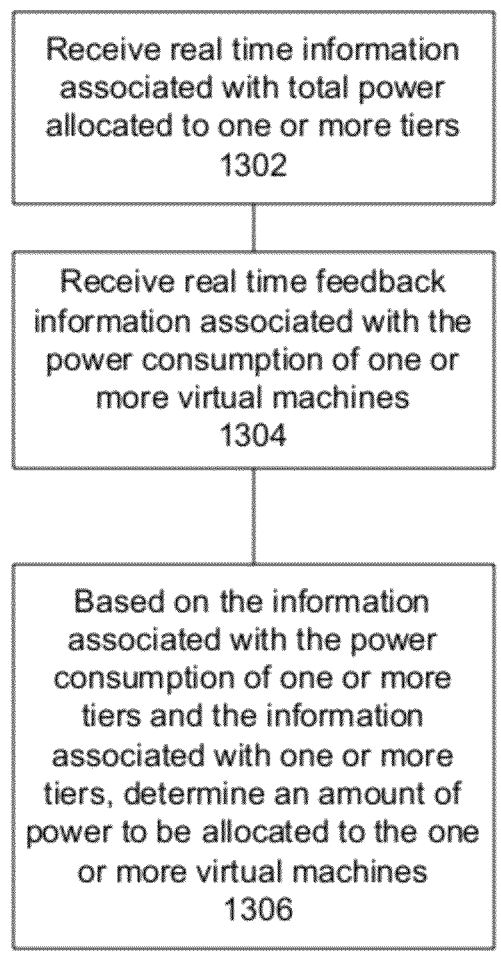
FIG. 13 depicts an example flowchart for virtualized application power budgeting for a tier controller.

FIG. 13 depicts an example flowchart of control over a tier by a tier controller. At step 1302, a tier controller may receive information related to the total power available to the tier. In one embodiment, this information may be received from an application controller. At step 1304, the tier controller may receive information associated with the power consumption of one or more virtual machines running a portion of the application tier. At step 1306, the tier controller may determine the amount of power to allocate to each virtual machine based on the information received in steps 1302 and 1304.

Figure 14:
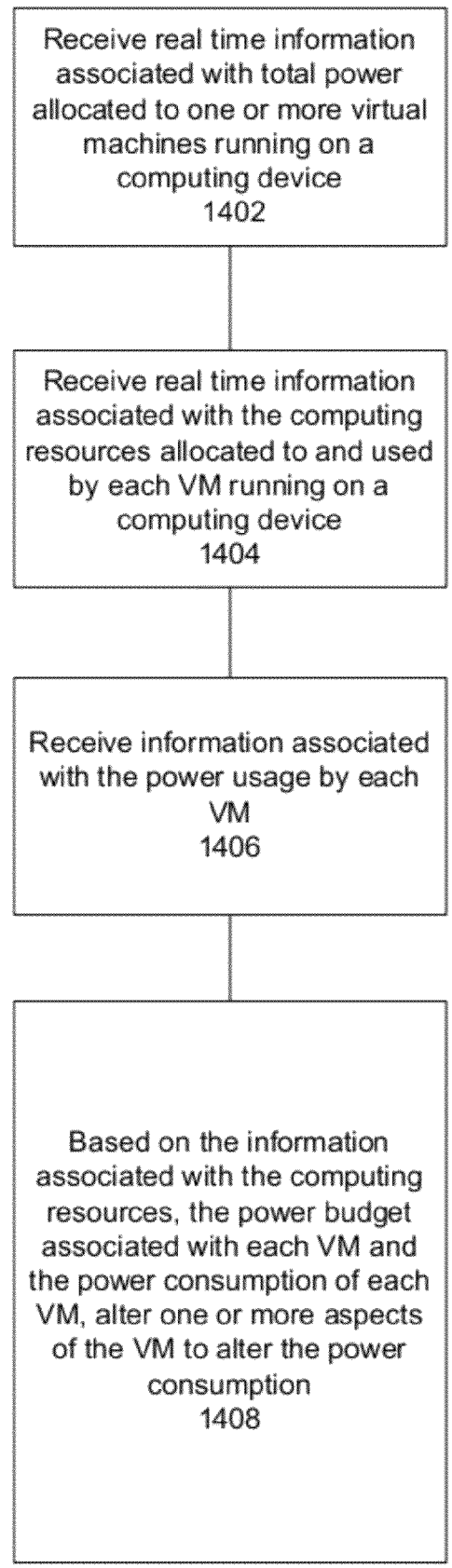
FIG. 14 depicts an example flowchart for virtualized application power budgeting for a computing device controller.

FIG. 14 depicts a flowchart for control over a computing device running one or more virtual machines that may be used in virtualized application power budgeting. At step 1402, information associated with the power available to each of the one or more virtual machines running on the computing device may be received. In one embodiment, this information may be received from one or more tier level controllers.

At step 1404, information associated with the computing resources allocated to and used by each of the one or more VMs running on the computing device may be received. As noted above, this information can be related to one or more metrics, such as CPU usage, usage of disks, drives, I/O devices, dedicated resources, base power, cooling devices, memories, and other computing elements.

At step 1406, information associated with the power consumption of each VM running on a computing device may be received.

At step 1408, the information from each of step 1402, 1404 and 1406 may be used to alter in some way the VM or the computing device to throttle down or throttle up a VM. In one embodiment, the DVFS and CPU usage may be altered in conjunction to change the consumption of power of one or more VMs on a computing device. In general, the amount of power used by each VM can be changed in a granular fashion selectively so that applications can be throttled back specifically without having to throttle back all applications simultaneously.

It should be understood that the configurations and/or approaches described herein are exemplary in nature, and that these specific embodiments or examples are not to be considered limiting. The specific routines or methods described herein may represent one or more of any number of processing strategies. As such, various acts illustrated may be performed in the sequence illustrated, in other sequences, in parallel, or the like. Likewise, the order of the above-described processes may be changed.

Additionally, the subject matter of the present disclosure includes combinations and sub-combinations of the various processes, systems and configurations, and other features, functions, acts, and/or properties disclosed herein, as well as equivalents thereof.

What is claimed:

1. A method for controlling power to an application the method comprising:
    receiving information indicative of an application power budget, a portion of the application configured to run on a virtual machine, the virtual machine associated with a computing device;
    receiving information indicative of power usage by the virtual machine; and
    sending, in response to receiving information indicative of power usage by the virtual machine, an instruction to alter the power usage of the virtual machine.

2. The method of claim 1 further comprising:
    providing feedback indicative of power consumption of the virtual machine.

3. The method of claim 2 further comprising allocating power amounts to at least one tier of the application.

4. The method of claim 2 further comprising monitoring and dividing power allocation among the virtual machine and another virtual machine.

5. The method of claim 1 wherein the instruction configured to alter the power consumption of the virtual machine is configured to change hardware/firmware of the computing device.

6. The method of claim 1 wherein the instruction configured to alter the power consumption of the virtual machine is configured to change an amount of processor time a scheduler on the computing device provides to the virtual machine.

7. The method of claim 1 further comprising dividing a total power available at a data center among a plurality of applications.

8. The method of claim 1 further comprising determining one or more power profiles, each power profile associated with the power consumption of an application.

9. A system for budgeting power among one or more applications, the system comprising:
    a first controller configured to enforce a division of power amongst one or more applications;
    a first computing device comprising at least one virtual machine, the at least one virtual machine running a portion of one of the one or more applications and wherein a second portion of the one or more applications configured to run on another computing device, the at least one virtual machine associated with a computing metric and a power consumption metric; and a second controller associated with a computing device, wherein the second controller is configured to manipulate one or more aspects of the one or more virtual machines to enforce a power budget.

10. The system of claim 9 further comprising a third controller configured to monitor a plurality of virtual machines, each virtual machine running on a separate computing device.

11. They system of claim 10 further comprising a fourth controller configured to monitor a plurality of tiers, each tier associated with a function of an application, each tier configured to run on one or more virtual machines.

12. The system of claim 11 wherein the fourth controller is configured to receive feedback from one or more controllers including the third controller and, based on the feedback, provide instructions configured to distribute power to each tier.

13. The system of claim 10 wherein the third controller is configured to receive feedback from one or more controllers including the second controller and, based on the feedback, provide instructions configured to distribute power to one or more virtual machines.

14. The system of claim 9 wherein the second controller changes an amount of processor time a scheduler on the computing device provides to the virtual machine.

15. The system of claim 9 wherein the second controller changes at least one of hardware or firmware associated with the one or more virtual machines to enforce the power budget.

16. The system of claim 9 wherein the first controller is configured to determine one or more power profiles, each power profile associated with an application.

17. A computer readable storage medium having stored thereon instructions, the instructions stored in a memory coupled to a processor that, when run on the processor, cause the processor to:
receive from a first controller, information indicative of an application power budget, the application configured to run on one or more virtual machines, each of the one or more virtual machine associated with one or more computing devices;
receive at a second controller information indicative of power usage by each virtual machine associated with the application; and
send, in response to receiving at a second controller information indicative of power usage by each virtual machine, an instruction, the instruction configured to alter the power usage of at least one of the one or more virtual machine.

18. The computer readable storage medium of claim 17 wherein the instruction configured to alter the power consumption of the one or more virtual machines is configured to change CPU usage of a virtual machine.

19. The computer readable medium of claim 17 wherein the first controller is configured to divide a total power available at a data center amongst a plurality of applications.

20. The computer readable storage medium of claim 17 wherein the first controller is configured to determine one or more power profiles, each power profile associated with the power consumption of an application associated with the first controller.

* * * * *